(12) United States Patent
Hamilton, II et al.

(10) Patent No.: US 6,763,378 B1
(45) Date of Patent: Jul. 13, 2004

(54) SYNCHRONOUS TCP/IP PORT MONITOR FOR ENHANCED COMPUTER SYSTEM SECURITY

(75) Inventors: Rick Allen Hamilton, II, Charlottesville, VA (US); John Steven Langford, Austin, TX (US); Steven Jay Lipton, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 09/687,077

(22) Filed: Oct. 12, 2000

(51) Int. Cl.[7] .............................................. G06F 15/16
(52) U.S. Cl. ...................................................... 709/223
(58) Field of Search .......................... 709/223; 713/201

(56) References Cited

U.S. PATENT DOCUMENTS 5,862,238 A * 1/1999 Agnew et al. .............. 381/321
6,021,789 A * 2/2000 Akatsu et al. ............ 134/57 R
6,094,434 A * 7/2000 Kotzur et al. ............... 370/401
6,260,073 B1 * 7/2001 Walker et al. .............. 709/249

* cited by examiner

Primary Examiner—David Y. Eng
(74) Attorney, Agent, or Firm—Duke W. Yee; David A. Mims, Jr.; Christopher P. O'Hagan

(57) ABSTRACT

A method for monitoring incoming data from an external computer network is provided. The invention comprises polling all active port connections in a data processing system at regular intervals and comparing these connections to a table of authorized ports and IP addresses. Any unauthorized connections are logged and a network administrator is notified. The present invention can be implemented on clients within a computer network.

23 Claims, 3 Drawing Sheets

SYNCHRONOUS TCP/IP PORT MONITOR FOR ENHANCED COMPUTER SYSTEM SECURITY

BACKGROUND OF THE INVENTION

1. Technical Field

The present invention relates to security in a network computer environment. More specifically, the present invention relates to security in computer networks which use several TCP/IP ports.

2. Description of Related Art

As applications become increasingly net-centric, myriad TCP/IP ports are tapped to provide various functions undreamed of only a few years ago. Numerous applications now communicate via obscure, but dedicated, TCP/IP ports and accordingly, provisions must be made within each system to allow connections upon these ports as warranted. If this increase in port nomenclature and usage were not enough to confound security, the boundaries between "secured" and "unsecured" are becoming more difficult to fathom as well, as the old model of a bastion firewall marking the border between a hostile outside and a benign corporate environment is increasingly outmoded.

This blurring of the lines can be demonstrated firstly by the incorporation of multiple web-servers, and even multiple domains, within the "secure" side of organizational firewalls. As outsiders are permitted electronic entry into an organization through designated TCP/IP ports, the old "outside-is-dangerous, inside-is-safe" model breaks down. Furthermore, organizations are increasingly subject to multiple levels of security even within their firewalls; examples of this are school districts, which need deterrents not only from the outside world, but also between the student-accessible computers and the administrative computers housing grades and student records.

It is clear that old security paradigms based upon a singular, well-controlled entry point into an organization now solve only part of the problem. It is also apparent that new security methods must be developed to safeguard systems as individual entities, given this new level of complexity inherent in system's models.

Because of the ambiguities between which subnetwork, machines and directory structures are safe and which are not, the solution should exist on the individual systems themselves. Secondly, because each unique system is going to be tasked with primary job responsibilities, it is of great importance that the systems not be loaded with any CPU-intensive processes in monitoring port usage upon its own system. Minimizing the impact of such a monitoring tool upon any jobs running on the targeted system is paramount. Security must not be accompanied by significant reduction in the performance of the host systems.

Currently, solutions exist only at the firewall, with the limitations described above, or at the host level, with heavy demands upon the resources of the target system. Therefore, a port monitoring method that can be implemented on the individual client computers in a network, but does not add an undue processing burden, would be desirable.

SUMMARY OF THE INVENTION

The present invention provides a method for monitoring incoming data from an external computer network. The invention comprises polling all active port connections in a data processing system at regular intervals and comparing these connections to a table of authorized ports and IP addresses. Any unauthorized connections are logged and a network administrator is notified. The present invention can be implemented on clients within a computer network.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
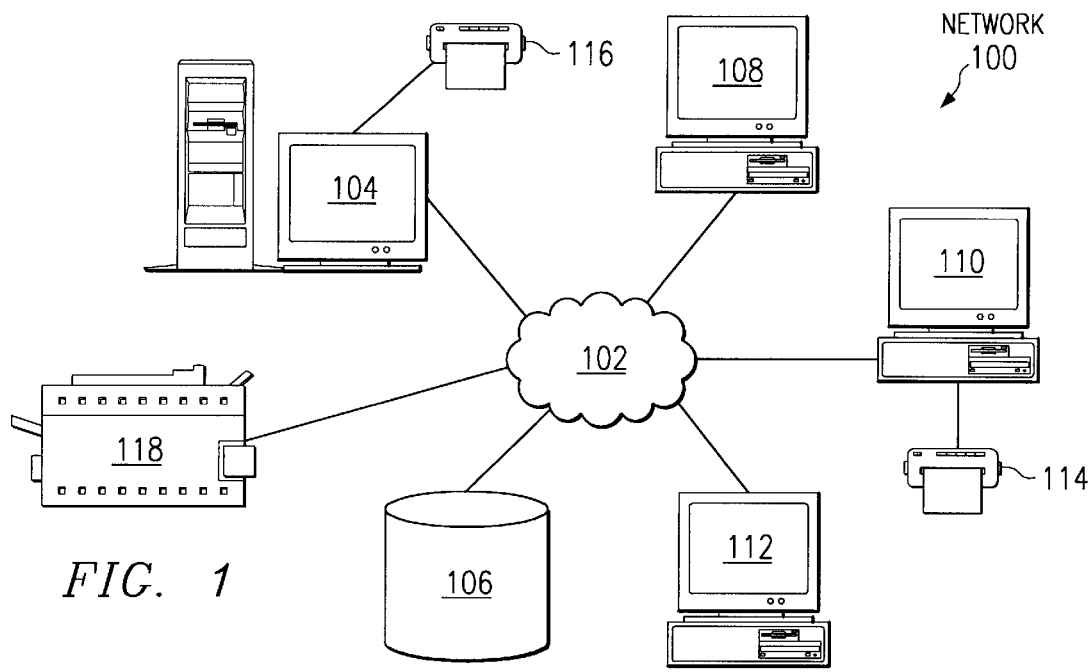
FIG. 1 depicts a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections. Connections are made via pathways, known as ports into and out of computers. In the depicted example, server 104 is connected to network 102, along with storage unit 106. In addition, clients 108, 110 and 112 are also connected to network 102. These clients, 108, 110 and 112, may be, for example, personal computers or network computers.

For purposes of this application, a network computer is any computer coupled to a network that receives a program or other application from another computer coupled to the network. In the depicted example, server 104 provides data, such as boot files, operating system images and applications, to clients 108–112. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

FIG. 1 is intended as an example and not as an architectural limitation for the processes of the present invention.

Figure 2:
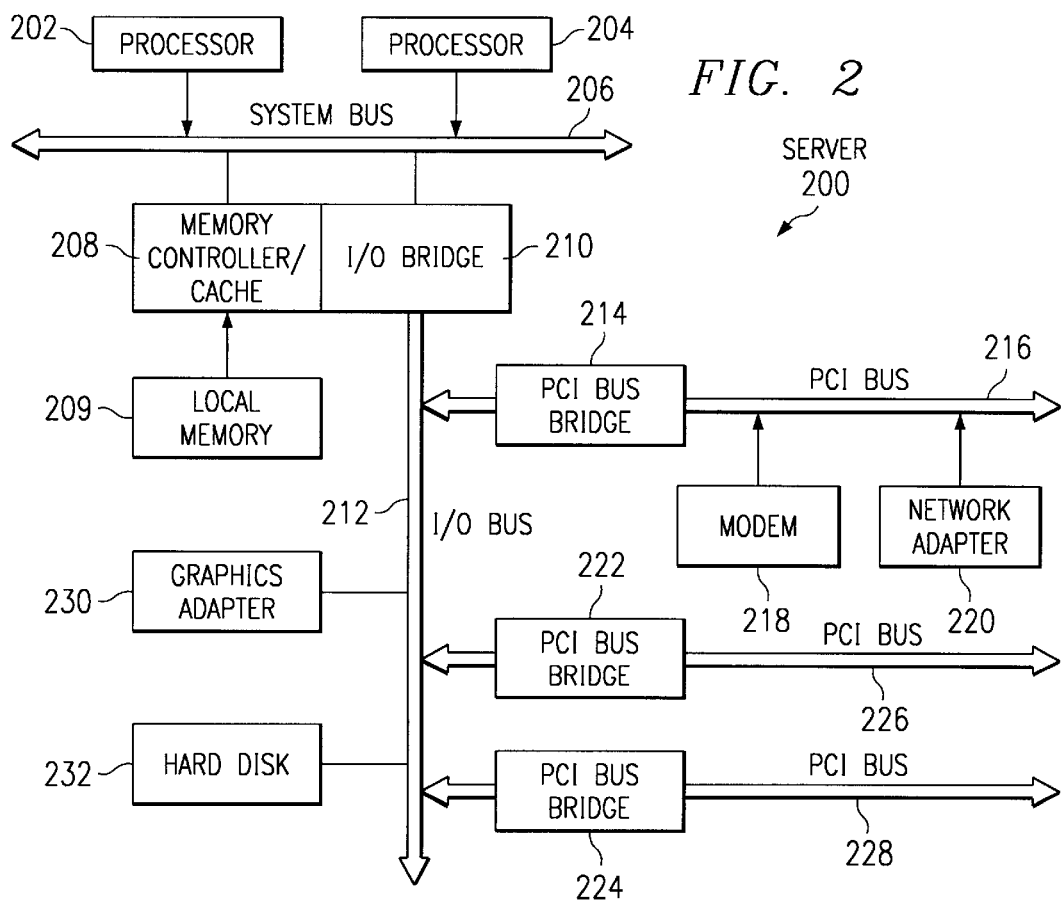
FIG. 2 depicts a block diagram of a data processing system which may be implemented as a server, in accordance with the present invention.

Referring to FIG. 2, a block diagram of a data processing system which may be implemented as a server, such as server 104 in FIG. 1, is depicted in accordance with the present invention. Data processing system.200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RS/6000, a product of International Business Machines Corporation in Armonk, New York, running the Advanced Interactive Executive (AIX) operating system.

Figure 3:
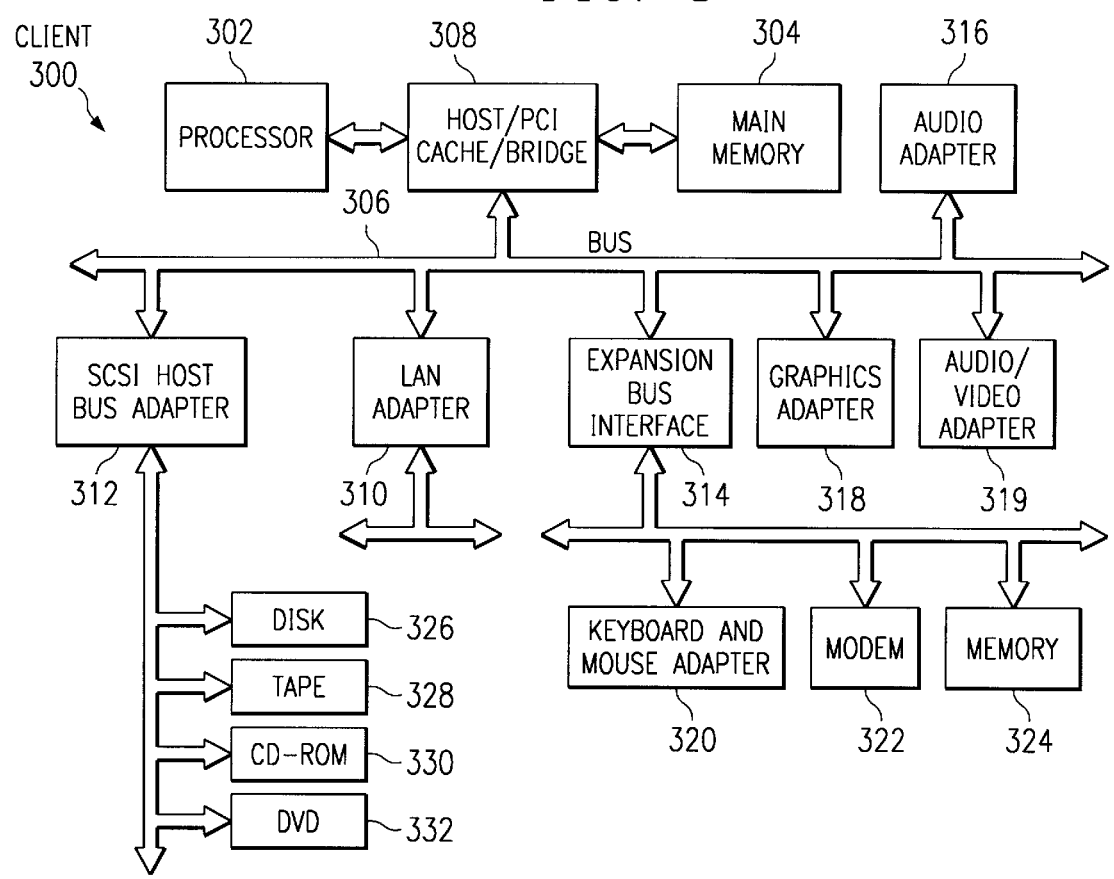
FIG. 3 depicts a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as AIX, which is available from International Business Machines Corporation. "AIX" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
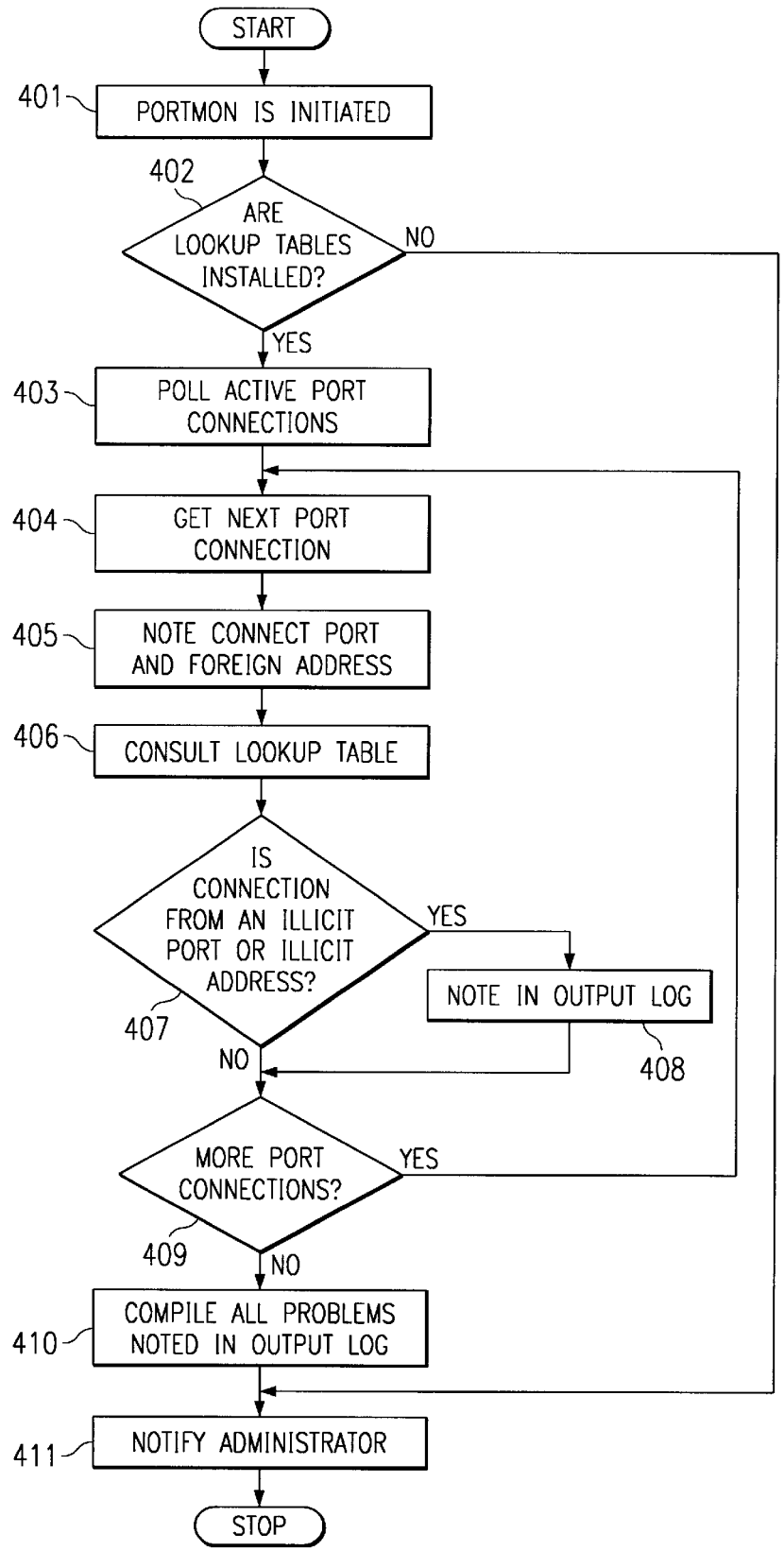
FIG. 4 depicts a flowchart illustrating a method for synchronous port monitoring, in accordance with the present invention.

Referring now to FIG. 4, a flowchart illustrating a method for synchronous port monitoring is depicted in accordance with the present invention. The example presented in FIG. 4 is based on a tool called portmon, which was developed by IBM. However, the present invention can be implemented in other formats and is not restricted to the portmon tool. Also note that, although the invention as described and detailed in this example was implemented upon UNIX systems, the concept behind the invention can be implemented with operating system-dependent syntax modifications to any computational device which accepts TCP/IP connections.

Most hacker methodologies achieve entry on arcane ports. In fact, hacking tools exist which scan the range of TCP ports, from outside the target system, to search for security weaknesses. Thus, portmon runs on the target client to monitor entry into obscure TCP/IP ports.

Portmon is initiated synchronously, that is, at regular intervals which are determined by the network administrator (step 401). For purposes of this example, it will be assumed that portmon is run once a minute via crontab, on its UNIX implementation. A crontab is a file of instructions that executes commands at a set time or time interval.

Once portmon has been initiated, it looks to see that the necessary lookup table is installed on the system (step 402). The lookup table contains information about permitted IP addresses and the ports which they may access. If the lookup table is not properly installed, an email is sent to the network administrator and the script exits (step 410).

If the lookup table is properly installed, portmon proceeds to examine all active ports (step 403). After polling an active port, portmon moves on to the next port connection (step 404). A note is made concerning each active port connection and the foreign address from which the connection has occurred (step 405). To reduce the processing load, all self-referential connections are ignored. Self-referential connections are created when different parts of the same system must communicate with each other. Since they do not represent a threat from the outside world, all lines which have identical local and foreign addresses are dropped from consideration.

For a given port connection, portmon consults the lookup table and finds what range of addresses are allowed to make such connections (step 406). If the connection is from a known-good port and a permitted address, portmon simply continues to the next connection entry (step 409).

If a given connection is from an illicit port, or from a known-good port, but from an illicit address, this fact is noted in an output log (step 408). After making this note, portmon then continues to the next connection entry (step 409).

Steps 404 through 409 are repeated until all active port connections have been polled. At the completion of the port survey, portman compiles all problems entered into the output log (if any)(step 410) and then sends an email to the administrator (step 411). The administrator email address can be contained within the body of the script itself. This location can also be changed to either a command line argument or a file-invoked address, which could initiate an automatic response.

Prior art approaches to providing security at the client level require constant monitoring of the contents of incoming traffic, which requires substantial processing. The present invention simply relies upon a synchronous "snapshot" of the connection ports and foreign IP addresses which are compared with a predefined lookup table, requiring far less processing resources. The present invention also relieves the network administrator from having to rely solely upon a firewall to screen the network from the outside world. By monitoring security at the client level, without imposing heavy processing loads on the target system, the present invention increases data security with a minimum of operator intervention and a minimum in performance degradation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for monitoring incoming data from an external computer network, comprising:

polling all active port connections in a data processing system;

determining if the connections are authorized; and logging any unauthorized connections.

2. The method according to claim 1, further comprising:

determining if a lookup table of authorized ports and authorized internet protocol addresses is properly installed; and notifying a network administrator and exiting if the lookup table is not properly installed.

3. The method according to claim 1, wherein the step of polling active port connections occurs at regular time intervals.

4. The method according to claim 3, wherein the time intervals are set by a network administrator.

5. The method according to claim 1, wherein the step of polling active port connections further comprises:

noting the port used in an active connection; and noting the foreign internet protocol address from which a connection is made.

6. The method according to claim 1, wherein the step of determining if the connections are authorized further comprises consulting a lookup table of authorized ports and authorized internet protocol addresses.

7. The method according to claim 6, wherein self-referential connections are ignored.

8. The method according to claim 1, wherein the step of logging any unauthorized connections further comprises notifying a network administrator.

9. The method according to claim 1, wherein the step of logging any unauthorized connections further comprises entering the logged data into a command line argument.

10. The method according to claim 1, wherein the step of logging any unauthorized connections further comprises sending the logged data to a file-invoked address.

11. The method according to claim 1, wherein all steps are performed on a client computer in a computer network.

12. A computer program product in a computer readable medium for use in a data processing system for monitoring incoming data from an external computer network, the computer program product comprising:

instructions for polling all active port connections in a data processing system;

instructions for determining if the connections are authorized; and instructions for logging any unauthorized connections.

13. The computer program product according to claim 12, further comprising:

instructions for determining if a lookup table of authorized ports and authorized internet protocol addresses is properly installed; and instructions for notifying a network administrator and exiting if the lookup table is not properly installed.

14. The computer program product according to claim 12, further comprising instructions for polling active port connections at regular time intervals.

15. The computer program product according to claim 14, wherein the time intervals are set by a network administrator.

16. The computer program product according to claim 12, wherein the instructions for polling active port connections further comprise:

instructions for noting the port used in an active connection; and instructions for noting the foreign internet protocol address from which a connection is made.

17. The computer program product according to claim 12, wherein the instructions for determining if the connections are authorized further comprise instructions for consulting a lookup table of authorized ports and authorized internet protocol addresses.

18. The computer program product according to claim 17, wherein self-referential connections are ignored.

19. The computer program product according to claim 12, wherein the instructions for logging any unauthorized connections further comprise instructions for notifying a network administrator.

20. The computer program product according to claim 12, wherein the instructions for logging any unauthorized connections further comprise instructions for entering the logged data into a command line argument.

21. The computer program product according to claim 12, wherein the instructions for logging any unauthorized connections further comprise instructions for sending the logged data to a file-invoked address.

22. The computer program product according to claim 12, wherein all instructions are performed on a client computer in a computer network.

23. A system for monitoring incoming data from an external computer network, comprising:

means for polling all active port connections in a data processing system;

means for determining if the connections are authorized; and means for logging any unauthorized connections.

* * * * *